United States Patent
Brock et al.

(10) Patent No.: US 8,042,001 B2
(45) Date of Patent: Oct. 18, 2011

(54) PROTECTING CODE FROM BREAKPOINTS

(75) Inventors: John Charles Brock, Rochester, MN (US); Gregory Alan Chaney, Mantorville, MN (US); Kevin J. Erickson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 12/077,629

(22) Filed: Mar. 19, 2008

(65) Prior Publication Data

US 2008/0178160 A1  Jul. 24, 2008

Related U.S. Application Data

(63) Continuation of application No. 10/920,060, filed on Aug. 17, 2004, now Pat. No. 7,406,625.

(51) Int. Cl.
*G06F 11/00* (2006.01)

(52) U.S. Cl. ........................................... 714/34

(58) Field of Classification Search ............. 714/13, 714/23–26, 29–37, 38.1, 38.11, 38.12, 38.13, 714/39, 46
See application file for complete search history.

(56) References Cited

U.S. PATENT DOCUMENTS

| | | | |
|---|---|---|---|
| 5,987,248 A * | 11/1999 | Murayama et al. | 717/125 |
| 6,412,078 B2 * | 6/2002 | Murotani et al. | 714/5.11 |
| 6,598,177 B1 | 7/2003 | Jones | |
| 6,615,374 B1 | 9/2003 | Moran | |
| 6,691,250 B1 | 2/2004 | Chandiramani | |
| 6,823,482 B2 | 11/2004 | Ahrens | |
| 7,162,664 B2 * | 1/2007 | Haselden et al. | 714/34 |
| 7,249,285 B2 * | 7/2007 | Brock et al. | 714/34 |
| 7,406,625 B2 * | 7/2008 | Brock et al. | 714/34 |
| 2002/0112203 A1 | 8/2002 | Andress | |
| 2003/0084375 A1 | 5/2003 | Moore | |
| 2003/0110407 A1 | 6/2003 | Maeda | |
| 2005/0160328 A1 | 7/2005 | Lesartre | |
| 2005/0257089 A1 * | 11/2005 | Williams et al. | 714/34 |

* cited by examiner

*Primary Examiner* — Nadeem Iqbal
(74) *Attorney, Agent, or Firm* — Owen J. Gamon (57) ABSTRACT

A computer system and storage medium that, in an embodiment, prohibit breakpoints from being set within a protected range. In an embodiment, a protected range may be an atomic operation synchronization code range, either based on instructions generated by a compiler or based on source statements that are compiler directives. When a command, such as an add breakpoint command is received, the address of the breakpoint is compared to the protected range, and if the address is within the protected range, the breakpoint is not set. In another embodiment, if the address is within the protected range, the breakpoint is set before the start or after the end of the protected range. In this way, the problems of endless loops may be obviated.

15 Claims, 5 Drawing Sheets

PROCEDURE TRACEBACK TABLE

| OFFSET TO STARTING ADDRESS ⸺305 | INSTRUCTION COUNT ⸺310 | ENTRY TYPE ⸺315 |
|---|---|---|
| 1022 | 45 | PROTECTED RANGE | ⸺302
|  |  |  | ⸺304

PROTECTING CODE FROM BREAKPOINTS

CROSS-REFERENCE TO RELATED APPLICATIONS

This is a continuation application of U.S. patent application Ser. No. 10/920,060, filed Aug. 17, 2004, now U.S. Pat. No. 7,406,625 to John C. Brock, et al., entitled "PROTECTING CODE FROM BREAKPOINTS," which title was amended to recite "PROTECTING A CODE RANGE IN A PROGRAM FROM BREAKPOINTS," which is herein incorporated by reference.

The present application is related to commonly-assigned patent application Ser. No. 10/808,739 filed on Mar. 25, 2004, entitled "Address Watch Breakpoints in Protected Code," which is herein incorporated by reference.

FIELD

An embodiment of the invention generally relates to computers. In particular, an embodiment of the invention generally relates to protecting atomic operation synchronization code ranges from interrupts caused by breakpoints.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

As the sophistication and complexity of computer software increase, the more difficult the software is to debug. Bugs are problems, faults, or errors in a computer program. Locating, analyzing, and correcting suspected faults in a computer program is a process known as "debugging." Typically, a programmer uses another computer program commonly known as a "debugger" to debug a program under development.

Conventional debuggers typically support two primary operations to assist a computer programmer. A first operation supported by conventional debuggers is a "step" function, which permits a computer programmer to process instructions (also known as "statements") in a computer program one-by-one and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed is executed.

To address this difficulty, a second operation supported by conventional debuggers is a breakpoint operation, which permits a computer programmer to identify with a breakpoint a precise instruction for which it is desired to halt execution of a computer program during execution. As a result, when a computer program is executed by a debugger, the program executes in a normal fashion until a breakpoint is reached. The breakpoint then causes an interrupt, which stops execution of the program and gives control to the debugger, which displays the results of the program and/or the state of the computer system to the programmer for analysis.

Typically, step operations and breakpoints are used together to simplify the debugging process. Specifically, a common debugging operation is to set a breakpoint at the beginning of a desired set of instructions to be analyzed and then begin executing the program. When the breakpoint is reached, the debugger halts the program, and the programmer then steps through the desired set of instructions line-by-line using the step operation. Consequently, a programmer is able to more quickly isolate and analyze a particular set of instructions without having to step through irrelevant portions of a computer program.

Unfortunately, a breakpoint can cause unrecoverable system hangs when the code encountering the breakpoint is protected by a hardware synchronization mechanism (HSM) that enforces atomic update of a storage location. Examples of hardware synchronization mechanisms are the PowerPC larx/stcx (load and reserve/store conditional) instruction forms, specifically the lwarx/stwcx (word-aligned) and ldarx/stdcx (double-word-aligned) forms, and the Intel Itanium lock instruction prefix. Since hardware synchronization mechanisms require uninterrupted code flow during their execution in order to effect the storage protection they are designed to perform, when an interrupt is issued to service a breakpoint within a hardware synchronization mechanism code range, the hardware reservation is lost or invalidated by the hardware synchronization mechanism, and a retry is required, causing an endless loop within the code range.

Without a better way to handle breakpoints, developers will continue to experience difficulty when debugging programs that use hardware synchronization mechanisms. Although the aforementioned problems have been described in the context of hardware synchronization mechanisms, they may occur in the context of any atomic operation synchronization code ranges.

SUMMARY

A computer system and storage medium are provided that, in an embodiment, prohibit breakpoints from being set within a protected range. In an embodiment, a protected range may be an atomic operation synchronization code range, either based on instructions generated by a compiler or based on source statements that are compiler directives. When a command, such as an add breakpoint command is received, the address of the breakpoint is compared to the protected range, and if the address is within the protected range, the breakpoint is not set. In another embodiment, if the address is within the protected range, the breakpoint is set before the start or after the end of the protected range. In this way, the problems of endless loops may be obviated.

DETAILED DESCRIPTION

Figure 1:
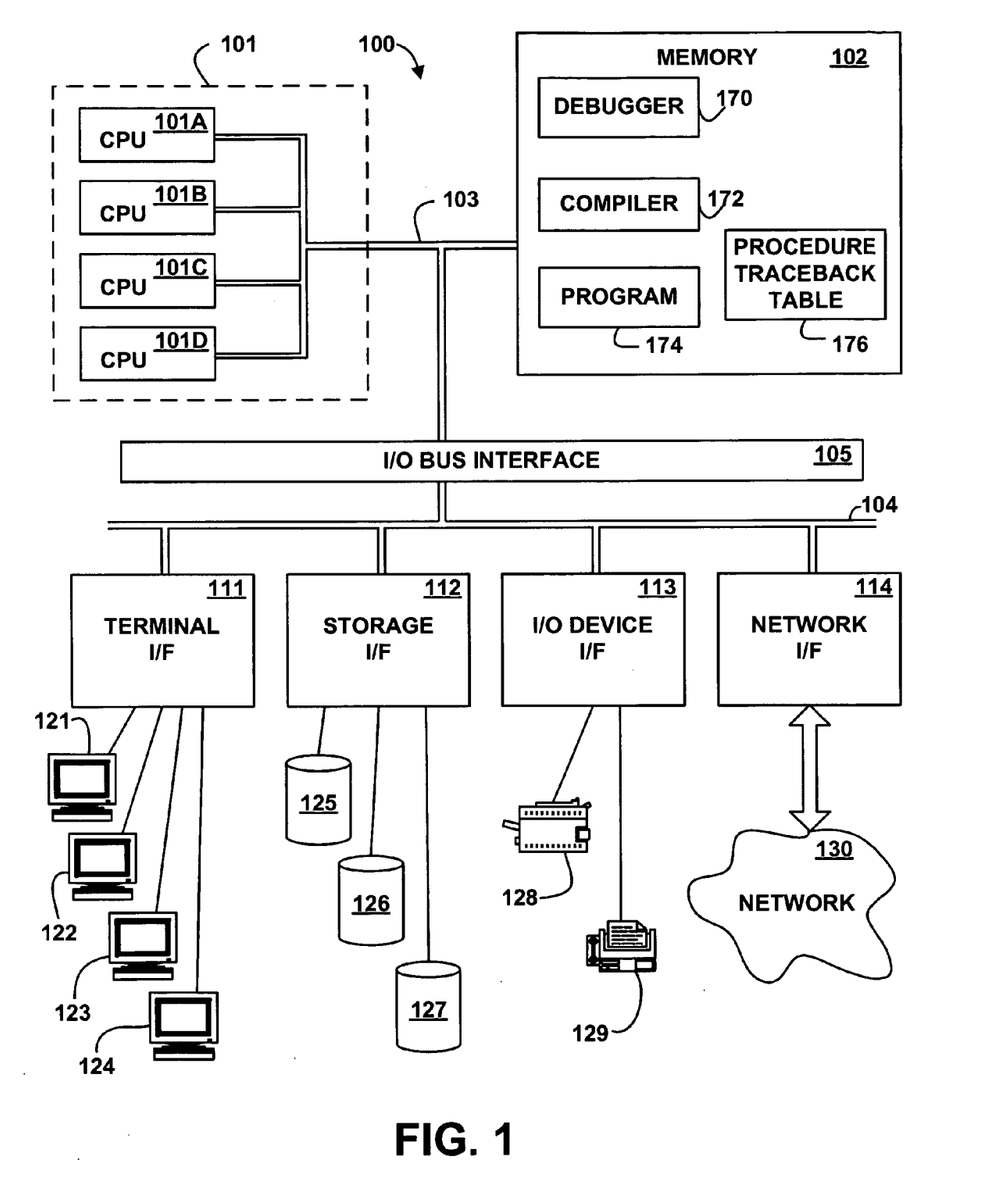
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as a processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a debugger 170, a compiler 172, a program 174, and a procedure traceback table 176. Although the debugger 170, the compiler 172, the program 174, and the procedure traceback table 176 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the debugger 170, the compiler 172, the program 174, and the procedure traceback table 176 are illustrated as being contained within the main memory 102, these elements are not necessarily all completely contained in the same storage device at the same time.

The debugger 170 may be used to debug the program 174 via breakpoints. In an embodiment, the debugger 170 includes instructions capable of executing on the processor 101 or statements capable of being interpreted by instructions executing on the processor 101 to perform the functions as further described below with reference to FIG. 5. In another embodiment, the debugger 170 may be implemented in microcode. In another embodiment, the debugger 170 may be implemented in hardware via logic gates and/or other appropriate hardware techniques.

At compilation time of the program 174, the compiler 172 recognizes code ranges that need protection and, in response, creates records in the procedure traceback table 176 to identify the protected ranges. In other embodiments, the compiler 172 may be an interpreter, a code generator, or any other type of application that processes statements or instructions in the program 174. In an embodiment, the compiler 172 includes instructions capable of executing on the processor 101 or statements capable of being interpreted by instructions executing on the processor 101 to perform the functions as further described below with reference to FIG. 4. In another embodiment, the compiler 172 may be implemented in microcode. In another embodiment, the compiler 172 may be implemented in hardware via logic gates and/or other appropriate hardware techniques.

The program 174 contains code to be debugged that executes on the processor 101. The program 174 includes a code range that needs protection, which in various embodiments may be delineated by atomic operation synchronization instructions generated and detected by the compiler or source instructions (compiler directives) generated by a programmer or other use and detected by the compiler 172. The actions of the debugger 170 and the compiler 172 created a protected range and prevent breakpoints from being set within the protected range of the program 174. Various embodiments of the program 174 are further described below with reference to FIGS. 2A and 2B.

The procedure traceback table 176 describes the protected ranges in the program 174 that are protected from breakpoints. The procedure traceback table 176 is further described below with reference to FIG. 3.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3× specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

It should be understood that FIG. 1 is intended to depict the representative major components of the computer system 100 at a high level, that individual components may have greater complexity than that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
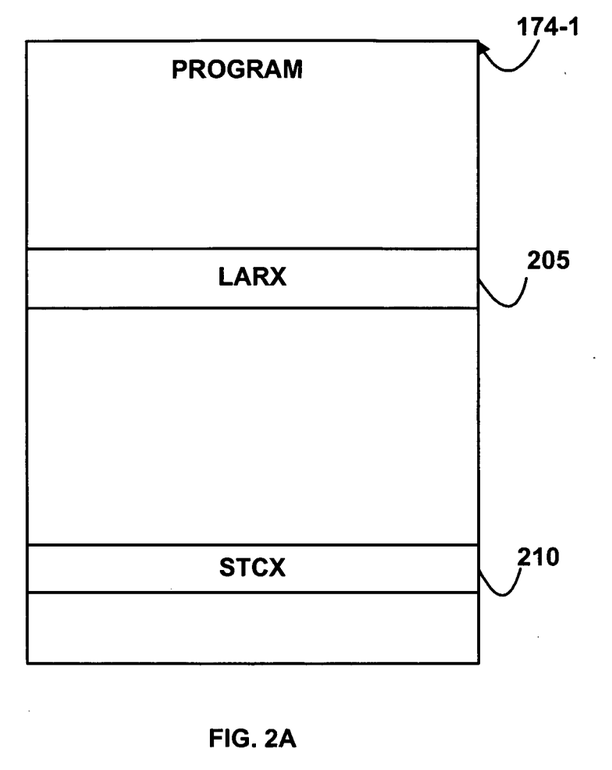
FIG. 2A depicts a block diagram of an example program to be debugged, where the program includes object code, according to an embodiment of the invention.

FIG. 2A depicts a block diagram of an example program 174-1 to be debugged, where the program 174-1 includes object code, according to an embodiment of the invention. The program 174-1 is an example of the program 174 (FIG. 1). The program 174-1 includes a starting atomic operation synchronization instruction 205 and an ending atomic operation synchronization 210. The starting atomic operation synchronization instruction 205 and the ending atomic operation synchronization 210 represent a hardware synchronization mechanism that enforces atomic update of a storage location and delineate a protected range in the program 174-1. In an embodiment, the compiler 172 generates the starting atomic operation synchronization instruction 205 and the ending atomic operation synchronization 210. Examples of atomic operation synchronization instructions are the PowerPC larx/stcx (load and reserve/store conditional) instruction forms, specifically the lwarx/stwcx (word-aligned) and ldarx/stdcx (double-word-aligned) forms, and the Intel Itanium lock instruction prefix. But, in other embodiments any appropriate atomic operation synchronization instructions may be used.

The actions of the debugger 170 and the compiler 172 prohibit breakpoints from being set in the protected range between the starting atomic operation synchronization instruction 205 and the ending atomic operation synchronization 210, as further described below with reference to FIGS. 4 and 5.

Figure 2B:
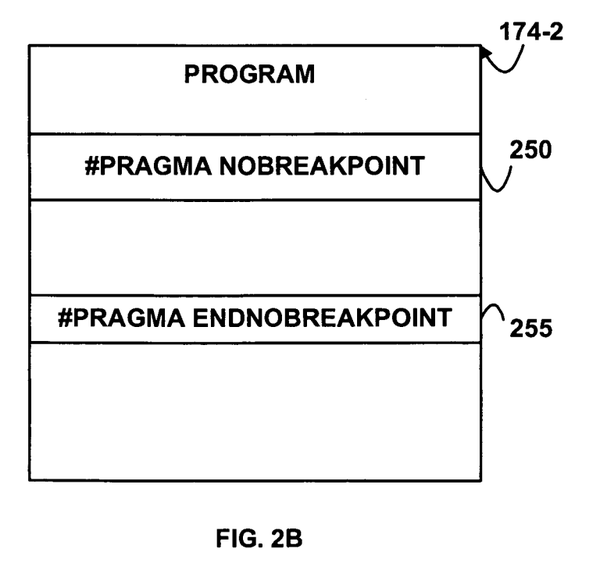
FIG. 2B depicts a block diagram of an example program to be debugged, where the program includes source code, according to an embodiment of the invention.

FIG. 2B depicts a block diagram of an example program 174-2 to be debugged, where the program 174-2 includes source code, according to an embodiment of the invention. The program 174-2 is an example of the program 174 (FIG. 1). The program 174-2 includes a starting nobreakpoint compiler directive 250 and an ending nobreakpoint compiler directive 255. The starting nobreakpoint compiler directive 250 and the ending nobreakpoint directive 255 are generated by a programmer or other user in the source of the example program 174-2. The compiler 172 delineates a protected range of the program 174-2 in response to the compiler directives 250 and 255. But, in other embodiments any appropriate compiler directives may be used that instruct the compiler 172 to create a protected range. In various embodiments, the compiler directives 250 and 255 indicate the start and end, respectively, of an atomic operation synchronization code range, or a code range that a programmer or other user desires to protect from breakpoints for any reason.

The debugger 170 and the compiler 172 prohibit breakpoints from being set in the protected range of code in the program 174 between the starting nobreakpoint compiler directive 250 and the ending nobreakpoint directive 255 as further described below with reference to FIGS. 4 and 5.

Figure 3:
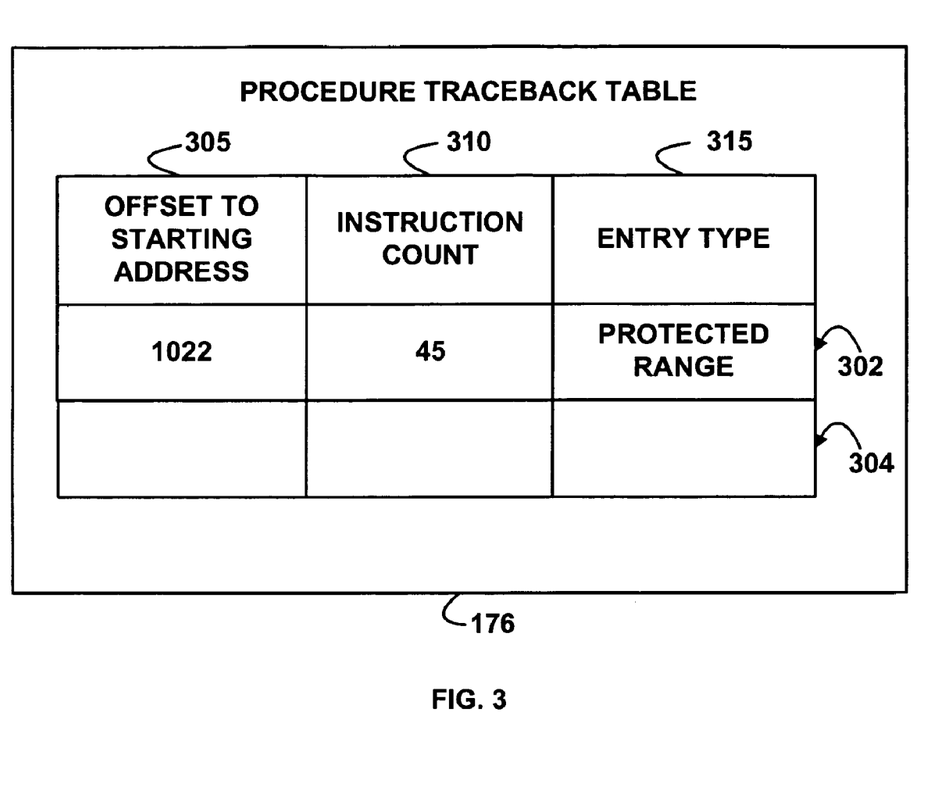
FIG. 3 depicts a block diagram of an example data structure for a procedure traceback table, according to an embodiment of the invention.

FIG. 3 depicts a block diagram of an example data structure for a procedure traceback table 176, according to an embodiment of the invention. The example procedure traceback table 176 includes records 302 and 304, but in other embodiments any number of records with any appropriate data may be present. Each of the records 302 and 304 describes a range of the code in the program 174 that is protected from breakpoints. The records 302 and 304 in the procedure traceback table 176 are created by the compiler 172, as further described below with reference to FIG. 4. Each of the records 302 and 304 includes an offset to a starting address field 305, an instruction count field 310, and an entry type field 315. The combination of the offset to the starting address field 305 and the instruction count field 310 describe the protected range within the program 174.

The offset to the starting address field 305 indicates the starting address of protected range, such as the address of the atomic operation synchronization instruction 205 or the compiler directive 250. Although the offset to the starting address field 305 indicates a relative address, in other embodiments the starting address field 305 may be an absolute address.

The instruction count field 310 indicates the number of instructions from the start of the protected range (indicated in the field 305) to the end of the protected range. For example, the instruction count field 310 may indicate the number of instructions from the address of the start atomic operation synchronization instruction 205 to the end atomic operation synchronization instruction 210 or the number of instructions from the nobreakpoint compiler directive 250 to the endno-breakpoint compiler directive 255. In other embodiments, the instruction count 310 may be implemented as a length, a byte count, or any other way to determine the end of the protected range. The entry type 315 indicates that the associated record, e.g., the record 302 or 304, describes a protected range.

Figure 4:
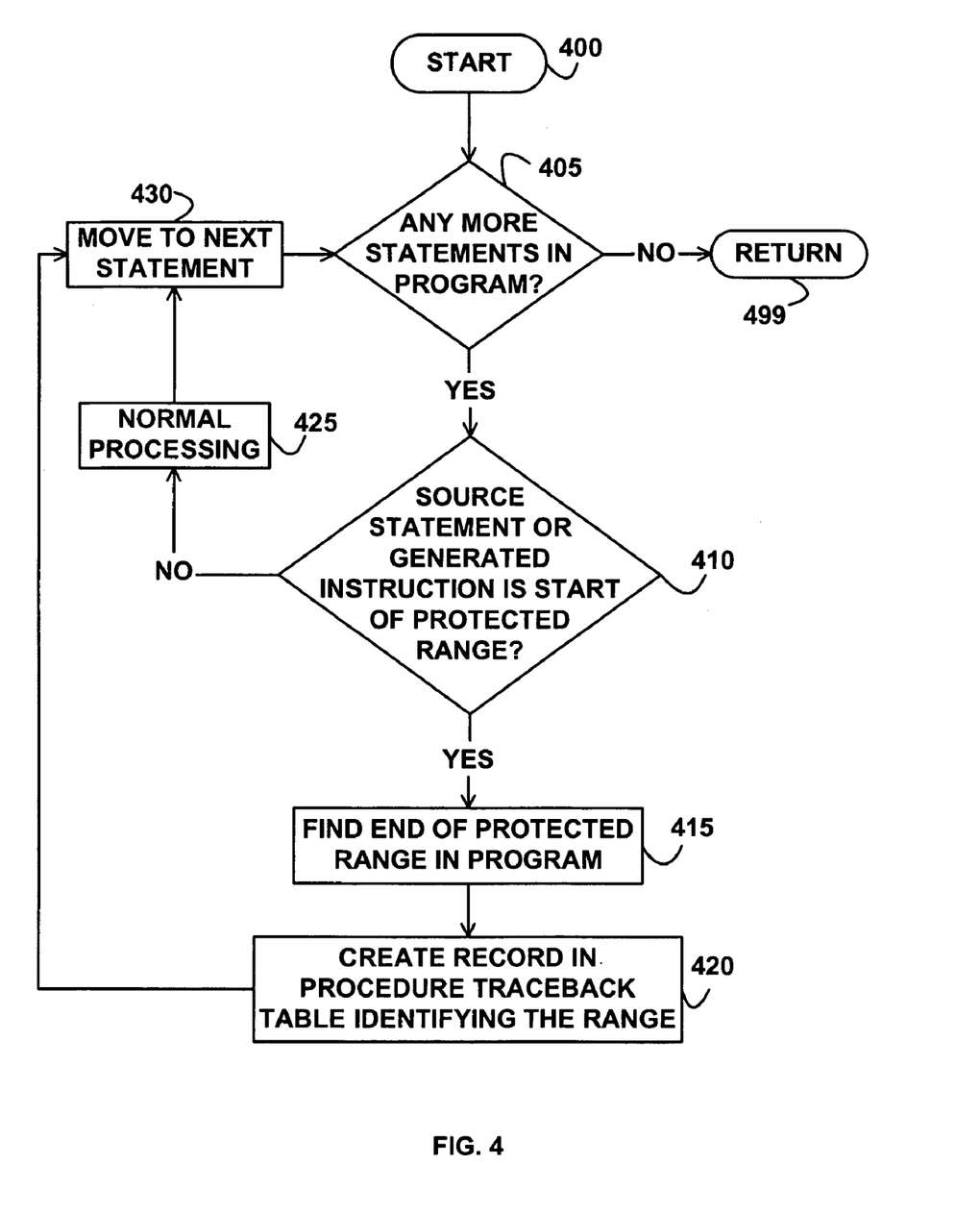
FIG. 4 depicts a flowchart of example processing for recognizing statements and instructions within a protected range, according to an embodiment of the invention.

FIG. 4 depicts a flowchart of example processing for recognizing statements and instructions within a protected range of the program 174, according to an embodiment of the invention. Control begins at block 400. Control then continues to block 405 where the compiler 172 determines whether any statements unprocessed by the logic of FIG. 4 remain in the program 174. If the determination at block 405 is true, then an unprocessed statement remains in the program 174, so control continues to block 410 where the compiler 172 determines whether the current statement or the instruction associated with the current statement in the program 174 is the start of a protected range. The compiler 172 makes the determination at block 410 by comparing the current statement or instruction to known starting atomic operation synchronization instructions, such as the starting atomic operation synchronization instruction 205, and known starting nobreakpoint compiler directives, such as the starting nobreakpoint compiler directive 250.

If the determination at block 410 is true, then the current statement or the instruction associated with the current statement in the program 174 is the start of the protected range, so control continues to block 415 where the compiler 172 searches for and finds the end of the protected range in the program 174. The compiler 172 finds the end of the protected range by searching for known ending atomic operation synchronization instructions, such as the ending atomic operation synchronization instruction 210, and known ending nobreakpoint compiler directives, such as the ending nobreakpoint compiler directive 255.

Control then continues to block 420 where the compiler 172 creates a record in the procedure traceback table 176 that identifies the protected range, as previously described above with reference to FIG. 3. The compiler 172 creates the offset to the starting address 305 in the procedure traceback table 176 based on the current statement or instruction and creates the instruction count 310 based on the difference between the current statement or instruction and the end of the protected range (previously found at block 415).

Control then continues to block 430 where the compiler 172 moves to the next statement in the program 174. Control then returns to block 405, as previously described above.

If the determination at block 410 is false, then the current statement or the instruction associated with the current statement in the program 174 is not the start of the protected range, so control continues to block 425 where the compiler 172 performs normal processing on the current statement or instruction. Control then continues to block 430, as previously described above.

If the determination at block 405 is false, then all statements in the program 174 have been processed by the logic of FIG. 4, so control continues to block 499 where the logic of FIG. 4 returns.

Figure 5:
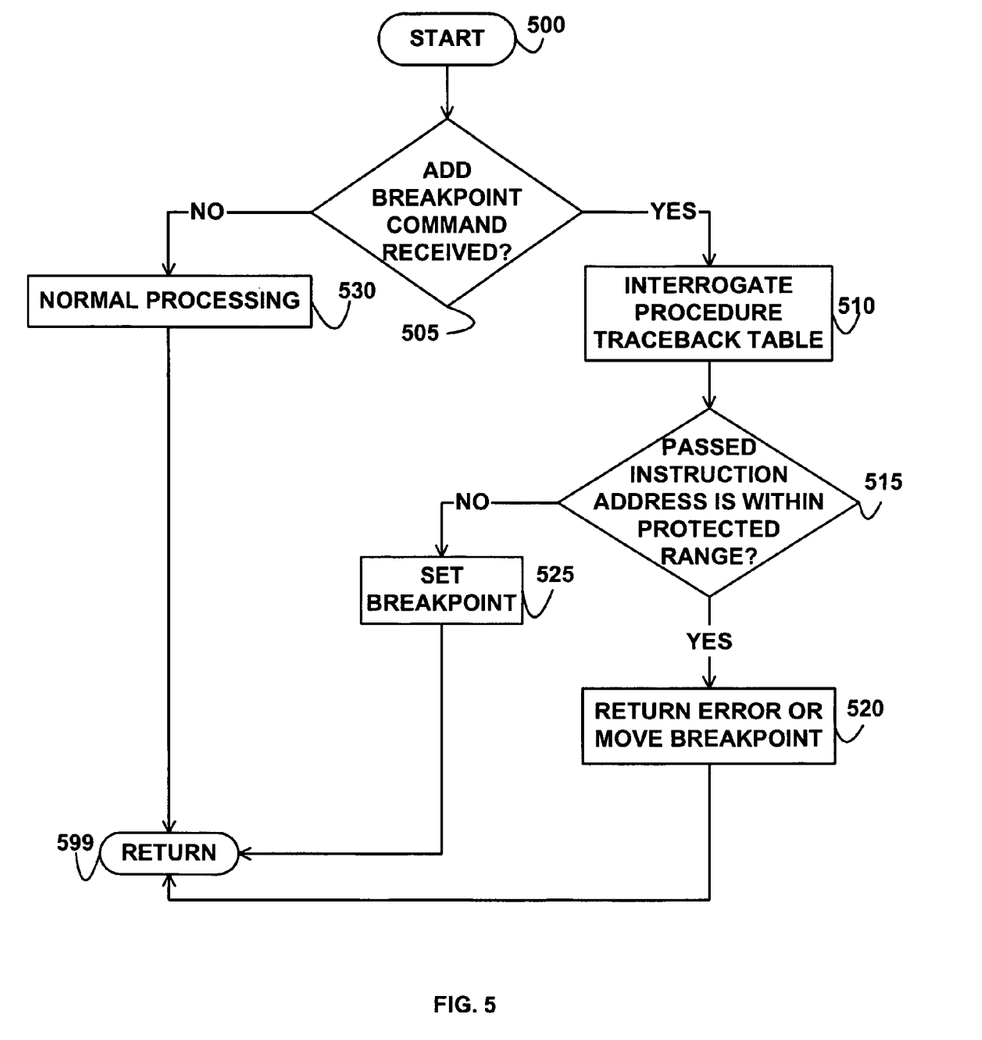
FIG. 5 depicts a flowchart of example processing for handling an add breakpoint command by a debugger, according to an embodiment of the invention.

FIG. 5 depicts a flowchart of example processing for handling an add breakpoint command by the debugger 170, according to an embodiment of the invention. Control begins at block 500. Control then continues to block 505 where the debugger 170 determines whether an add breakpoint command has been received. If the determination at block 505 is true, then an add breakpoint command has been received, so control continues to block 510 where the debugger 170 interrogates the procedure traceback table 176, searching for a record that specifies a protected range that encompasses an instruction address associated with the received add breakpoint command. Control then continues to block 515 where the debugger 170 determines whether the passed instruction address is within a protected range specified by a record in the procedure traceback table 176.

If the determination at block 515 is true, then the passed instruction address is within a protected range in the procedure traceback table 176, so control continues to block 520 where the debugger 170 returns an error or moves the breakpoint outside the protected range. Moving a breakpoint outside a protected range is described in U.S. patent application Ser. No. 10/808,739 filed on Mar. 25, 2004, entitled "Address Watch Breakpoints in Protected Code," which is hereby incorporated by reference. Control then continues to block 599 where the logic of FIG. 5 returns.

If the determination at block 515 is false, then the passed instruction address is not within a protected range specified in the procedure traceback table 176, so control continues to block 525 where the debugger 170 sets the breakpoint in the program 174. Control then continues to block 599 where the logic of FIG. 5 returns.

If the determination at block 505 is false, then an add breakpoint command has not been received, so control continues to block 530 where the debugger 170 performs normal processing of whatever command was received. Control then continues to block 599 where the logic of FIG. 5 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A storage medium encoded with instructions, wherein the instructions when executed comprise:
    determining whether an instruction to which a breakpoint is directed is within a protected range in a program, wherein the protected range is protected from the breakpoint being set;
    prohibiting the breakpoint from being set within the protected range if the determining is true; and
    setting the breakpoint if the determining is false.

2. The storage medium of claim 1, further comprising:
    detecting the protected range based on atomic operation synchronization code instructions that delineate the protected range.

3. The storage medium of claim 1, further comprising:
    detecting the protected range based on source statements in the program that delineate the protected range.

4. The storage medium of claim 3, wherein the source statements comprise compiler directives identifying the protected range.

5. The storage medium of claim 2, wherein the atomic operation synchronization code instructions enforce an atomic update of a storage location.

6. A storage medium encoded with instructions, wherein the instructions when executed comprise:
    finding a start of an atomic operation synchronization code range in a program;
    finding an end of the atomic operation synchronization code range in the program; and
    marking the atomic operation synchronization code range as protected from breakpoints.

7. The storage medium of claim 6, further comprising:
    receiving a command that requests a breakpoint to be set in the program; and
    determining whether an address of the breakpoint is within the atomic operation synchronization code range that is marked as protected.

8. The storage medium of claim 7, further comprising:
    if the determining is true, prohibiting the breakpoint from being set.

9. The storage medium of claim 8, further comprising:
    if the determining is true, setting the breakpoint after the atomic operation synchronization code range that is marked as protected.

10. The storage medium of claim 7, wherein the start of the atomic operation synchronization code range and the end of the atomic operation synchronization code range comprise instructions that enforce an atomic update of a storage location.

11. A computer system comprising:
    a processor; and
    a main memory encoded with instructions, wherein the instructions when executed on the processor comprise:
        finding a start of a code range in a program,
        finding an end of the code range in the program,
        marking the code range as protected from breakpoints being set,
        receiving a command that requests a breakpoint to be set in the program, and
        determining whether an address of the breakpoint is within the code range that is marked as protected.

12. The computer system of claim 11, wherein the instructions further comprise:
    if the determining is true, prohibiting the breakpoint from being set.

13. The computer system of claim 11, wherein the start of the code range and the end of the code range are indicated by code generated by a compiler.

14. The computer system of claim 11, wherein the start of the code range and the end of the code range are indicated by source compiler directives.

15. The computer system of claim 11, wherein the start of the code range and the end of the code range are indicated by atomic operation synchronization instructions that enforce an atomic update of a storage location.

* * * * *